(12) United States Patent
Park

(10) Patent No.: US 7,449,523 B2
(45) Date of Patent: Nov. 11, 2008

(54) FLUOROCARBON ELASTOMER COMPOSITIONS CONTAINING WEAR REDUCING ADDITIVES

(75) Inventor: Edward Hosung Park, Saline, MI (US)

(73) Assignee: Freudenberg-NOK General Partnership, Plymouth, MI (US)

(*) Notice: Subject to any disclaimer, the term of this patent is extended or adjusted under 35 U.S.C. 154(b) by 253 days.

(21) Appl. No.: 11/022,715

(22) Filed: Dec. 27, 2004

(65) Prior Publication Data

US 2006/0142467 A1      Jun. 29, 2006

(51) Int. Cl.
   *C08F 259/08*     (2006.01)
(52) U.S. Cl. ............. 525/199; 524/463; 524/544; 524/545; 524/546; 525/200; 525/276
(58) Field of Classification Search ........ 525/199, 525/200, 276; 524/544, 545, 546
   See application file for complete search history.

(56) References Cited

U.S. PATENT DOCUMENTS

| | | | |
|---|---|---|---|
| 2,476,884 A | 7/1949 | Maynard | |
| 3,037,954 A | 6/1962 | Gessler et al. | |
| 3,538,028 A | 11/1970 | Morgan | |
| 3,580,889 A | 5/1971 | Barney et al. | ............. 525/132 |
| 3,787,341 A | 1/1974 | Aron | |
| 3,853,811 A | 12/1974 | Chandrasekaran | |
| 3,884,877 A | 5/1975 | Kolb | |
| 4,035,565 A | 7/1977 | Apotheker et al. | |
| 4,094,949 A | 6/1978 | Yokokawa et al. | |
| 4,287,320 A | 9/1981 | Kolb | |
| 4,311,628 A | 1/1982 | Abdou-Sabet et al. | |
| 4,328,140 A | 5/1982 | Singletary et al. | |
| 4,419,499 A | 12/1983 | Coran et al. | |
| 4,450,263 A | 5/1984 | West | |
| 4,451,542 A | 5/1984 | Ishida et al. | |
| 4,491,536 A | 1/1985 | Tomoda | |
| 4,530,881 A | 7/1985 | Santoso et al. | |
| 4,572,516 A | 2/1986 | Symons et al. | |
| 4,624,978 A | 11/1986 | Frayer | |
| 4,656,228 A | 4/1987 | Richter et al. | |
| 4,696,976 A | 9/1987 | Ellerbe, III et al. | |
| 4,696,989 A | 9/1987 | Oka et al. | |
| 4,696,998 A | 9/1987 | Brunelle et al. | ............. 528/272 |
| 4,713,418 A | 12/1987 | Logothetis et al. | |
| 4,787,991 A | 11/1988 | Morozumi et al. | |
| 4,812,357 A | 3/1989 | O'Rell et al. | |
| 5,006,594 A * | 4/1991 | Rees | ............. 524/520 |
| 5,095,072 A | 3/1992 | Kobayashi et al. | |
| 5,108,780 A * | 4/1992 | Pitt et al. | ............. 427/538 |
| 5,206,293 A * | 4/1993 | Sakai et al. | ............. 525/194 |
| 5,219,931 A | 6/1993 | Siol et al. | |
| 5,331,040 A | 7/1994 | Lee | |
| 5,354,811 A | 10/1994 | Kamiya et al. | |
| 5,371,143 A | 12/1994 | Novak et al. | |
| 5,384,374 A | 1/1995 | Guerra et al. | |
| 5,391,610 A | 2/1995 | Comert et al. | |
| 5,397,832 A | 3/1995 | Ellul | |
| 5,459,202 A * | 10/1995 | Martinez et al. | ............. 525/200 |
| 5,548,028 A | 8/1996 | Tabb | |
| 5,585,152 A | 12/1996 | Tamura et al. | |
| 5,589,526 A | 12/1996 | Sienel et al. | |
| 5,639,810 A | 6/1997 | Smith, III et al. | ............. 524/269 |
| 5,700,866 A | 12/1997 | Tabb | |
| 5,723,544 A | 3/1998 | Lee | |
| 5,747,588 A | 5/1998 | Mann | |
| 5,792,348 A | 8/1998 | Eisinga | |
| 5,910,544 A | 6/1999 | Ozawa et al. | |
| 5,962,589 A | 10/1999 | Matsumoto et al. | |
| 6,048,939 A | 4/2000 | Priester | ............. 525/198 |
| 6,054,537 A | 4/2000 | Shimizu et al. | |
| 6,066,697 A | 5/2000 | Coran et al. | |
| 6,079,465 A | 6/2000 | Takeyama et al. | ............. 152/510 |
| 6,114,441 A | 9/2000 | Spohn et al. | |
| 6,147,158 A | 11/2000 | Chmielewski | |

(Continued)

FOREIGN PATENT DOCUMENTS

| | | |
|---|---|---|
| CA | 2475263 | 9/2003 |
| CA | 2513789 | 8/2004 |
| EP | 0132583 | 2/1985 |
| EP | 0148719 | 7/1985 |
| EP | 0168020 | 1/1986 |

(Continued)

OTHER PUBLICATIONS

"Polyurethanes" Encyclopedia of Polymer Science & Engineering, vol. 13, Second Edition. (pp. 274-278).
Webpage: "Dyneon™ Fluorothermoplastics" Accessed from 3M Manufacturing and Industrial and Downloaded May 8, 2003. (2 pages).
Schmiegel, Walter W., "A Review of Recent Progress in the Design and Reactions of Base-Resistant Fluoroelastomers", DuPont Dow Elastomers, IRC, Jul. 2003.

(Continued)

*Primary Examiner*—Peter D. Mulcahy
*Assistant Examiner*—Henry Hu
(74) *Attorney, Agent, or Firm*—Ronald W. Wangerow; Harness, Dickey & Pierce, P.L.C.

(57) ABSTRACT

Processable rubber compositions contain a vulcanized fluorocarbon elastomer and wear reducing additives dispersed in a matrix of a thermoplastic polymeric material. In one embodiment the matrix forms a continuous phase and the vulcanized elastomeric material is in the form of particles forming a non-continuous phase. The compositions are made by combining a curative, an uncured fluorocarbon elastomer, a wear reducing additive and a thermoplastic material, and heating the mixture at a temperature and for a time sufficient to effect vulcanization of the elastomeric material, while mechanical energy is applied to mix the mixture during the heating step. Shaped articles such as seals, gaskets, O-rings, and hoses may be readily formed from the rubber compositions according to conventional thermoplastic processes such as blow molding, injection molding, and extrusion.

19 Claims, No Drawings

U.S. PATENT DOCUMENTS

| | | | |
|---|---|---|---|
| 6,162,385 | A | 12/2000 | Grosse-Puppendahl et al. |
| 6,310,141 | B1 | 10/2001 | Chen et al. |
| 6,312,639 | B1 | 11/2001 | Ertle et al. |
| 6,407,174 | B1 | 6/2002 | Ouhadi |
| 6,410,630 | B1 | 6/2002 | Hoover et al. |
| 6,429,249 | B1 | 8/2002 | Chen et al. |
| 6,437,030 | B1 | 8/2002 | Coran et al. |
| 6,500,374 | B1 | 12/2002 | Akioka et al. |
| 6,624,251 | B1 * | 9/2003 | Chmielewski ............. 525/199 |
| 6,649,704 | B2 | 11/2003 | Brewer et al. |
| 6,656,831 | B1 | 12/2003 | Lee et al. |
| 6,663,966 | B2 | 12/2003 | Mhetar |
| 6,872,325 | B2 | 3/2005 | Bandyopadhyay et al. |
| 7,022,769 | B2 | 4/2006 | Park |
| 7,029,750 | B2 * | 4/2006 | Takei et al. ................. 428/327 |
| 7,098,270 | B2 | 8/2006 | Hochgesang et al. |
| 2002/0099142 | A1 | 7/2002 | Faulkner |
| 2002/0113066 | A1 | 8/2002 | Stark et al. |
| 2002/0122928 | A1 | 9/2002 | Botrie et al. |
| 2002/0198320 | A1 | 12/2002 | Chmielewski et al. |
| 2003/0026995 | A1 | 2/2003 | Duchesne et al. |
| 2003/0138655 | A1 | 7/2003 | Watanabe et al. |
| 2003/0144409 | A1 | 7/2003 | Kassa et al. |
| 2003/0166780 | A1 | 9/2003 | Shimizu et al. |
| 2004/0183702 | A1 | 9/2004 | Nachtigal et al. |
| 2004/0260023 | A1 | 12/2004 | Park et al. |
| 2005/0014900 | A1 * | 1/2005 | Park .......................... 525/191 |
| 2005/0148183 | A1 | 7/2005 | Shiro et al. |
| 2005/0155690 | A1 | 7/2005 | Park |
| 2005/0165168 | A1 | 7/2005 | Park |
| 2005/0167928 | A1 | 8/2005 | Park et al. |
| 2005/0171282 | A1 | 8/2005 | Park |
| 2005/0222337 | A1 * | 10/2005 | Park .......................... 525/199 |
| 2005/0272872 | A1 | 12/2005 | Park |
| 2005/0275565 | A1 | 12/2005 | Nachtigal et al. |
| 2005/0281973 | A1 | 12/2005 | Park |
| 2005/0288434 | A1 | 12/2005 | Sugiura et al. |
| 2006/0003127 | A1 | 1/2006 | Park et al. |
| 2006/0004126 | A1 | 1/2006 | Park et al. |
| 2006/0004142 | A1 | 1/2006 | Park et al. |
| 2006/0124889 | A1 | 6/2006 | Park et al. |
| 2006/0142491 | A1 | 6/2006 | Park |
| 2006/0142492 | A1 | 6/2006 | Park |
| 2006/0148954 | A1 | 7/2006 | Park et al. |
| 2006/0290070 | A1 | 12/2006 | Park |
| 2007/0004862 | A1 | 1/2007 | Park et al. |
| 2007/0004865 | A1 | 1/2007 | Park |
| 2007/0044906 | A1 | 3/2007 | Park |
| 2007/0055020 | A1 | 3/2007 | Park |
| 2008/0149881 | A1 | 6/2008 | Park |
| 2008/0157439 | A1 | 7/2008 | Park et al. |

FOREIGN PATENT DOCUMENTS

| | | |
|---|---|---|
| EP | 0239707 | 10/1987 |
| EP | 422960 A2 * | 4/1991 |
| EP | 0432911 | 6/1991 |
| EP | 432911 A1 * | 6/1991 |
| EP | 439734 B1 * | 8/1991 |
| EP | 0254307 | 12/1991 |
| EP | 0304843 | 3/1993 |
| EP | 0566313 | 10/1993 |
| EP | 0681113 | 11/1995 |
| EP | 0714944 | 6/1996 |
| EP | 1209203 | 5/2002 |
| GB | 1357904 | 6/1974 |
| JP | 58-032655 | 2/1983 |
| JP | 62-011767 | 1/1987 |
| JP | 62-236841 | 10/1987 |
| JP | 05-156090 | 6/1993 |
| JP | 05-186606 | 7/1993 |
| JP | 06-016949 | 1/1994 |
| JP | 11-140269 | 5/1999 |
| JP | 2000-079928 | 3/2000 |
| JP | 2001-336679 | 12/2001 |
| WO | WO-96/00761 * | 1/1996 |
| WO | WO 00/11073 | 3/2000 |
| WO | 0148077 | 7/2001 |
| WO | WO 01/98405 | 12/2001 |
| WO | WO-01/98405 A2 * | 12/2001 |

OTHER PUBLICATIONS

Moore, Michael J. "Silanes as Rubber-to-Metal Bonding Agents," 160th Meeting of the Rubber Division, American Chemical Society, Cleveland, Ohio, Paper No. 105, (2001). (17 pages).

Material Safety Data Sheet "DuPont™ TPV 60A01 and 80A01", C.S. Wong, (Sep. 18, 2001). (9 pages).

Kim, K. et al. "Mold Release Additive Effects on Chlorine and Fluorine Rubber Compound" Struktol Company of America Paper No. 7, Presented at IRMC 2004 Meeting. Apr. 27-28, 2004. (18 pages).

Solvay Solexis: "Product Data Sheet: Tecnoflon FPA 1" available at www.solvaysolexis.com. Copyright 2003. (2 pages).

"AFLAS™ The Fluoroelastomer", Asahi Glass Company, Product Information (Apr. 11, 2003) at www.agc.co.jp.

"Fluorine-Containing Polymers", Encyclopedia of Polymer Science & Engineering, vol. 7, 1987, Second Edition, pp. 256-267.

"Viton® fluoroelastomer, A product of DuPont Dow Elastomers", Technical Information, DuPont Dow Elastomers, Copyright 1988.

* cited by examiner

FLUOROCARBON ELASTOMER COMPOSITIONS CONTAINING WEAR REDUCING ADDITIVES

BACKGROUND

The present invention relates to thermoplastic vulcanizates. It also relates to shaft seal and gasket type material made from the compositions, and methods for their production by dynamic vulcanization techniques.

Cured elastomeric materials have a desirable set of physical properties typical of the elastomeric state. They show a high tendency to return to their original size and shape following removal of a deforming force, and they retain physical properties after repeated cycles of stretching, including strain levels up to 1000%. Based on these properties, the materials are generally useful for making shaped articles such as seals and gaskets.

Because they are thermoset materials, cured elastomeric materials can not generally be processed by conventional thermoplastic techniques such as injection molding, extrusion, or blow molding. Rather, articles must be fashioned from elastomeric materials by high temperature curing and compression molding. Although these and other rubber compounding operations are conventional and known, they nevertheless tend to be more expensive and require higher capital investment than the relatively simpler thermoplastic processing techniques. Another drawback is that scrap generated in the manufacturing process is difficult to recycle and reuse, which further adds to the cost of manufacturing such articles.

In today's automobile engines, the high temperatures of use have led to the development of a new generation of lubricants containing a high level of basic materials such as amines. Articles made from elastomeric materials, such as seals and gaskets, are in contact with such fluids during use, and are subject to a wide variety of challenging environmental conditions, including exposure to high temperature, contact with corrosive chemicals, and high wear conditions during normal use. Accordingly, it is desirable to make such articles from materials that combine elastomeric properties and stability or resistance to the environmental conditions.

Fluorocarbon elastomers have been developed that are highly resistant to the basic compounds found in the lubricating oils and greases. Such elastomers include those based on copolymers of tetrafluoroethylene and propylene. However, as a thermoset material, such cured fluorocarbon elastomers are subject to the processing disadvantages noted above. Thus, it would be desirable to provide an elastomeric or rubber composition that would combine a chemical resistance with the advantages of thermoplastic processability.

SUMMARY

The present invention provides elastomeric compositions, and methods for making them. Embodiments include compositions comprising a cured fluorocarbon elastomer having an elastomer wear package dispersed in a thermoplastic matrix having a thermoplastic wear package, wherein the composition is dynamically vulcanized. Also provided are compositions made by a process comprising dynamically vulcanizing a fluorocarbon elastomer in the presence of a fluorine-containing thermoplastic material and wear packages. Methods include those comprising:

(a) forming a mixture of a thermoplastic material with a thermoplastic wear package;
(b) adding an elastomeric material and mixing to form a homogeneous blend;
(c) adding an elastomeric wear package and curative package;
(d) heating, mixing and dynamically vulcanizing the mixture; and
(e) pelletizing a cured mixture.

In various embodiments, the fluorocarbon elastomer additive, or first wear package, comprises fillers selected from the group consisting of graphite, calcium meta-silicate, wollastonite, and mixtures thereof. The thermoplastic additive, or second wear package, comprises fillers selected from the group consisting of PTFE powder, graphite powder, polyimide powder, $MoS_2$ powder, silicone powder, carbon fiber, boron fiber, aramid fiber, silicone oil, uncured fluorocarbon elastomer, and mixtures thereof.

Shaped articles may be readily formed from the rubber compositions containing wear packages according to conventional thermoplastic processes such as blow molding, injection molding, and extrusion. Examples of useful articles include seals, gaskets, O-rings, and hoses.

It has been found that the compositions and methods of this invention afford advantages over compositions and methods among those known in the art. Such advantages include one or more of improved physical characteristics, reduced manufacturing cost, and enhanced recyclability of material. Further benefits and embodiments of the present invention are apparent from the description set forth herein.

DESCRIPTION

The following definitions and non-limiting guidelines must be considered in reviewing the description of this invention set forth herein.

The headings (such as "Introduction" and "Summary,") and sub-headings (such as "Elastomeric Material") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations of the stated features. Specific Examples are provided for illustrative purposes of how to make, use and practice the compositions and methods of this invention and, unless explicitly stated otherwise, are not intended to be a representation that given embodiments of this invention have, or have not, been made or tested.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention.

Processable rubber compositions are provided that contain a vulcanized elastomeric material and wear reducing additives dispersed in a thermoplastic matrix. The vulcanized elastomeric material is the product of vulcanizing, crosslinking, or curing a fluorocarbon elastomer. The processable rubber compositions may be processed by conventional thermoplastic techniques to form shaped articles having physical properties that make them useful in a number of applications calling for elastomeric properties.

Elastomeric Material:

Preferred fluorocarbon elastomers include commercially available copolymers of one or more fluorine containing monomers, chiefly vinylidene fluoride (VDF), hexafluoropropylene (HFP), tetrafluoroethylene (TFE), and perfluorovinyl ethers (PFVE). Preferred PFVE include those with a C1-8 perfluoroalkyl group, preferably perfluoroalkyl groups with 1 to 6 carbons, and particularly perfluoromethyl vinyl ether and perfluoropropyl vinyl ether. In addition, the copolymers may also contain repeating units derived from olefins such as ethylene (Et) and propylene (Pr). The copolymers may also contain relatively minor amounts of cure site monomers (CSM), discussed further below. Preferred copolymer fluorocarbon elastomers include VDF/HFP, VDF/HFP/CSM, VDF/HFP/TFE, VDF/HFP/TFE/CSM, VDF/PFVE/TFE/CSM, TFE/Pr, TFE/Pr/VDF, TFE/Et/PFVE/VDF/CSM, TFE/Et/PFVE/CSM and TFE/PFVE/CSM. The elastomer designation gives the monomers from which the elastomer gums are synthesized. The elastomer gums have viscosities that give a Mooney viscosity in the range generally of about 15-160 (ML1+10, large rotor at about 121° C.), which can be selected for a combination of flow and physical properties. Elastomer suppliers include Dyneon (3M), Asahi Glass Fluoropolymers, Solvay/Ausimont, Dupont, and Daikin.

Thermoplastic Matrix:

In various embodiments, the thermoplastic material making up the matrix includes at least one component that is a non-fluorine containing thermoplastic polymer. In other embodiments, the thermoplastic material includes a fluorine containing thermoplastic material. The polymeric material softens and flows upon heating. In one aspect, a thermoplastic material is one the melt viscosity of which can be measured, such as by ASTM D-1238 or D-2116, at a temperature above its melting point.

The thermoplastic material of the invention may be selected to provide enhanced properties of the rubber/thermoplastic combination at elevated temperatures, preferably above about 100° C. and more preferably at about 150° C. and higher. Such thermoplastics include those that maintain physical properties, such as at least one of tensile strength, modulus, and elongation at break to an acceptable degree at the elevated temperature. In a preferred embodiment, the thermoplastics possess physical properties at the elevated temperatures that are superior (i.e. higher tensile strength, higher modulus, and/or higher elongation at break) to those of the cured fluorocarbon elastomer (rubber) at a comparable temperature.

The thermoplastic polymeric material used in the invention may be a thermoplastic elastomer. Thermoplastic elastomers have some physical properties of rubber, such as softness, flexibility and resilience, but may be processed like thermoplastics. A transition from a melt to a solid rubber-like composition occurs fairly rapidly upon cooling. This is in contrast to conventional elastomers, which harden slowly upon heating. Thermoplastic elastomers may be processed on conventional plastic equipment such as injection molders and extruders. Scrap may generally be readily recycled.

Thermoplastic elastomers have a multi-phase structure, wherein the phases are generally intimately mixed. In many cases, the phases are held together by graft or block copolymerization. At least one phase is made of a material that is hard at room temperature but fluid upon heating. Another phase is a softer material that is rubber like at room temperature.

Some thermoplastic elastomers have an A-B-A block copolymer structure, where A represents hard segments and B is a soft segment. Because most polymeric material tend to be incompatible with one another, the hard and soft segments of thermoplastic elastomers tend to associate with one another to form hard and soft phases. For example, the hard segments tend to form spherical regions or domains dispersed in a continuous elastomer phase. At room temperature, the domains are hard and act as physical crosslinks tying together elastomeric chains in a 3-D network. The domains tend to lose strength when the material is heated or dissolved in a solvent.

Other thermoplastic elastomers have a repeating structure represented by (A-B)n, where A represents the hard segments and B the soft segments as described above.

Many thermoplastic elastomers are known. Non-limiting examples of A-B-A type thermoplastic elastomers include polystyrene/polysiloxane/polystyrene, polystyrene/polyethylene-co-butylene/polystyrene, polystyrene/polybutadiene polystyrene, polystyrene/polyisoprene/polystyrene, poly-α-methyl styrene/polybutadiene/poly-α-methyl styrene, poly-α-methyl styrene/polyisoprene/poly-α-methyl styrene, and polyethylene/polyethylene-co-butylene/polyethylene.

Non-limiting examples of thermoplastic elastomers having a (A-B)n repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Among the most common commercially available thermoplastic elastomers are those that contain polystyrene as the hard segment. Triblock elastomers are available with polystyrene as the hard segment and either polybutadiene, polyisoprene, or polyethylene-co-butylene as the soft segment. Similarly, styrene butadiene repeating co-polymers are commercially available, as well as polystyrene/polyisoprene repeating polymers.

In a preferred embodiment, a thermoplastic elastomer is used that has alternating blocks of polyamide and polyether. Such materials are commercially available, for example from Atofina under the Pebax® trade name. The polyamide blocks may be derived from a copolymer of a diacid component and a diamine component, or may be prepared by homopolymerization of a cyclic lactam. The polyether block is generally derived from homo- or copolymers of cyclic ethers such as ethylene oxide, propylene oxide, and tetrahydrofuran.

The thermoplastic polymeric material may also be selected from among solid, generally high molecular weight, plastic materials. Preferably, the materials are crystalline or semi-crystalline polymers, and more preferably have a crystallinity of at least 25 percent as measured by differential scanning calorimetry. Amorphous polymers with a suitably high glass transition temperature are also acceptable as the thermoplastic polymeric material. The thermoplastic also preferably has a melt temperature or glass transition temperature in the range from about 80° C. to about 350° C., but the melt temperature should generally be lower than the decomposition temperature of the thermoplastic vulcanizate.

Non-limiting examples of thermoplastic polymers include polyolefins, polyesters, nylons, polycarbonates, styrene-acrylonitrile copolymers, polyethylene terephthalate, polybutylene terephthalate, polyamides, polystyrene, polystyrene derivatives, polyphenylene oxide, polyoxymethylene, and fluorine-containing thermoplastics.

Polyolefins are formed by polymerizing α-olefins such as, but not limited to, ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. These homopolymers and copolymers, and blends of them, may be incorporated as the thermoplastic polymeric material of the invention.

Polyester thermoplastics contain repeating ester linking units in the polymer backbone. In one embodiment, they contain repeating units derived from low molecular weight diols and low molecular weight aromatic diacids. Non-limiting examples include the commercially available grades of polyethylene terephthalate and polybutylene terephthalate. Alternatively, the polyesters may be based on aliphatic diols and aliphatic diacids. Exemplary here the copolymers of ethylene glycol or butanediol with adipic acid. In another embodiment, the thermoplastic polyesters are polylactones, prepared by polymerizing a monomer containing both hydroxyl and carboxyl functionality. Polycaprolactone is a non-limiting example of this class of thermoplastic polyester.

Polyamide thermoplastics contain repeating amide linkages in the polymer backbone. In one embodiment, the polyamides contain repeating units derived from diamine and diacid monomers such as the well known nylon 66, a polymer of hexamethylene diamine and adipic acid. Other nylons have structures resulting from varying the size of the diamine and diacid components. Non-limiting examples include nylon 610, nylon 612, nylon 46, and nylon 6/66 copolymer. In another embodiment, the polyamides have a structure resulting from polymerizing a monomer with both amine and carboxyl functionality. Non-limiting examples include nylon 6 (polycaprolactam), nylon 11, and nylon 12.

Other polyamides made from diamine and diacid components include the high temperature aromatic polyamides containing repeating units derived from diamines and aromatic diacids such as terephthalic acid. Commercially available examples of these include PA6T (a copolymer of hexanediamine and terephthalic acid), and PA9T (a copolymer of nonanediamine and terephthalic acid), sold by Kuraray under the Genestar tradename. For some applications, the melting point of some aromatic polyamides may be higher than optimum for thermoplastic processing. In such cases, the melting point may be lowered by preparing appropriate copolymers. In a non-limiting example, in the case of PA6T, which has a melting temperature of about 370° C., it is possible to in effect lower the melting point to below a moldable temperature of 320° C. by including an effective amount of a non-aromatic diacid such as adipic acid when making the polymer.

In another preferred embodiment, an aromatic polyamide is used based on a copolymer of an aromatic diacid such as terephthalic acid and a diamine containing greater than 6 carbon atoms, preferably containing 9 carbon atoms or more. The upper limit of the length of the carbon chain of the diamine is limited from a practical standpoint by the availability of suitable monomers for the polymer synthesis. As a rule, suitable diamines include those having from 7 to 20 carbon atoms, preferably in the range of 9 to 15 carbons, and more preferably in the range from 9 to 12 carbons. Preferred embodiments include C9, C10, and C11 diamine based aromatic polyamides. It is believed that such aromatic polyamides exhibit an increase level of solvent resistance based on the oleophilic nature of the carbon chain having greater than 6 carbons. If desired to reduce the melting point below a preferred molding temperature (typically 320° C. or lower), the aromatic polyamide based on diamines of greater than 6 carbons may contain an effective amount of a non-aromatic diacid, as discussed above with the aromatic polyamide based on a 6 carbon diamine. Such effective amount of diacid should be enough to lower the melting point into a desired molding temperature range, without unacceptably affecting the desired solvent resistance properties.

Other non-limiting examples of high temperature thermoplastics include polyphenylene sulfide, liquid crystal polymers, and high temperature polyimides. Liquid crystal polymers are based chemically on linear polymers containing repeating linear aromatic rings. Because of the aromatic structure, the materials form domains in the nematic melt state with a characteristic spacing detectable by x-ray diffraction methods. Examples of materials include copolymers of hydroxybenzoic acid, or copolymers of ethylene glycol and linear aromatic diesters such as terephthalic acid or naphthalene dicarboxylic acid.

High temperature thermoplastic polyimides include the polymeric reaction products of aromatic dianhydrides and aromatic diamines. They are commercially available from a number of sources. Exemplary is a copolymer of 1,4-benzenediamine and 1,2,4,5-benzenetetracarboxylic acid dianhydride.

In one embodiment, the matrix comprises at least one non-fluorine containing thermoplastic, such as those described above. Thermoplastic fluorine-containing polymers may be selected from a wide range of polymers and commercial products. The polymers are melt processable—they soften and flow when heated, and can be readily processed in thermoplastic techniques such as injection molding, extrusion, compression molding, and blow molding. The materials are readily recyclable by melting and re-processing.

The thermoplastic polymers may be fully fluorinated or partially fluorinated. Fully fluorinated thermoplastic polymers include copolymers of tetrafluoroethylene and perfluoroalkyl vinyl ethers. The perfluoroalkyl group is preferably of 1 to 6 carbon atoms. Other examples of copolymers are PFA (copolymer of TFE and perfluoropropyl vinyl ether) and MFA (copolymer of TFE and perfluoromethyl vinyl ether). Other examples of fully fluorinated thermoplastic polymers include copolymers of TFE with perfluoroolefins of 3 to 8 carbon atoms. Non-limiting examples include FEP (copolymer of TFE and hexafluoropropylene).

Partially fluorinated thermoplastic polymers include E-TFE (copolymer of ethylene and TFE), E-CTFE (copolymer of ethylene and chlorotrifluoroethylene), and PVDF (polyvinylidene fluoride). A number of thermoplastic copolymers of vinylidene fluoride are also suitable thermoplastic polymers for use in the invention. These include, without limitation, copolymers with perfluoroolefins such as hexafluoropropylene, and copolymers with chlorotrifluoroethylene.

Thermoplastic terpolymers may also be used. These include thermoplastic terpolymers of TFE, HFP, and vinylidene fluoride.

These and other fluorine-containing thermoplastic materials are commercially available. Suppliers include Dyneon (3M), Daikin, Asahi Glass Fluoroplastics, Solvay/Ausimont and DuPont.

Wear Reducing Additives:

The compositions of the present invention comprise at least one wear additive, or wear package. As referred to herein, "wear additives" and "wear packages" include materials operable in a composition of the invention to improve one or more properties of the composition. Improved properties include one or more chemical or physical properties relating to the formulation, function or utility of the composition, such as physical characteristics, more specifically wear performance characteristics, applicability to specific end-use devices or environments, the ease of manufacturing the composition, and ease of processing the composition after its manufacture. In various embodiments, a single wear additive, or wear package, is added to the elastomer and plastic phases. In other embodiments, mixtures of wear additives, or wear packages are added to the individual phases during processing.

The addition of both elastomer wear packages and plastic wear packages improves the wear characteristics of dynamically vulcanized thermoplastic materials. The addition of a wear package with the elastomer phase minimizes later wear in the elastomeric portion of the composition. Similarly, the addition of a wear package with the thermoplastic phase minimizes wear in the plastic matrix portion. In certain embodiments, the manufacturing processes require premixing of fibers and polymer. The mixing process is often critically important for uniform dispersion and may be accomplished by shear mixing. In various embodiments, the mixing is aided by the addition of at least one wear additive or wear package. Thus, embodiments of the present invention include compositions comprising a mixture of cured fluorocarbon elastomer having a first wear package that is dispersed in a thermoplastic matrix having a second wear package, wherein the composition is dynamically vulcanized.

In many applications, the enhanced wear properties realized from the addition of various wear packages in both the elastomer and plastic phases of the thermoplastic vulcanizates extend the lifetime of parts and greatly improves their performance. The addition of a wear package is additionally realized in the plastic phase, in part due to the formation of a plastic phase skin that may form during the injection molding, or extrusion processes of thermoplastic vulcanizate materials. In the formation of seals, for example, the wear additives added to both phases improve the performance by reducing wear at the interface of a shaft, initially with the exposure to the plastic phase skin, and later with the exposure of the elastomeric particles.

In various embodiments, the compositions comprise wear additives in a total amount from about 0.1 to about 25% by weight of the composition. Preferably, the compositions comprise from about 1 to about 20%, or from about 5 to 15% wear additives. In certain embodiments, the elastomer wear package is present at a level of between about 1% to about 15% by weight based on the total weight of the cured fluorocarbon elastomer and elastomer wear package combined. Similarly, the thermoplastic wear package is present at a level of between about 1% to about 10% by weight based on the total weight of the thermoplastic material and thermoplastic wear package combined.

Non-limiting examples of fluorocarbon elastomer wear additives, or the first wear package, include additives selected from the group consisting of graphite, calcium metasilicate, wollastonite, and mixtures thereof. As used herein, "wollastonite" refers to a white calcium metasilicate filler. It provides increased dimensional stability and scratch resistance. Wollastonite is also added to increase mechanical performance and increase the heat deflection time. Non-limiting examples of thermoplastic wear additives, or the second wear package, include additives selected from the group consisting of PTFE powder, graphite powder, polyimide powder, MoS2 powder, silicone powder, carbon fiber, boron fiber, aramid fiber, silicone oil, uncured fluorocarbon elastomer, and mixtures thereof.

One embodiment of an aramid fiber wear additive useful herein is Kevlar®, commercially available and marketed by E. I. du Pont de Nemours and Company. Kevlar® is a polyamide in which all of the amide groups are separated by paraphenylene groups, that is, the amide groups attach to the phenol rings opposite to each other, at carbons 1 and 4.

Various grades of graphite may be used in the present invention, and can have an LOI (Loss on Ignition) range from about 72 to about 99%, preferably from about 92 to about 97%. The graphite may be powdered, natural crystalline vein, crystalline flake, amorphous graphite, synthetic graphite, calcined petroleum coke, and mixtures thereof. In one presently preferred embodiment, the graphite is natural crystalline vein. Preferably the grain size distribution is from about 15 to about 850 microns, more preferably from about 25 to about 200 microns.

As used herein, powder form is defined as a solid, dry, additive material of small particle size, in some embodiments ranging down to colloidal dimensions, and includes granules, flakes, dust, and mixtures thereof. The additives may be transformed into powder form in any manner known in the art. Non-limiting examples include comminuting larger units via mechanical grinding, by combustion (carbon black), and by precipitation via a chemical reaction.

In various embodiments, certain wear additives may exhibit compatibility issues with elastomers, plastics, and elastomer/plastic compounds, including thermoplastic vulcanizate compositions containing cured fluorocarbon elastomers. Poor adherence to the matrix may yield less desirable physical properties. The modification and coating of a certain wear additive surfaces improves the effectiveness of the additive by enhancing the affinity among the additives, elastomers and plastics.

The surface treatment of wear additives by chemical or physical means helps to improve interfacial bonding to the matrix. In preferred embodiments, certain additives such as aramid and carbon fibers are etched, chemically treated, or have a coating applied to improve the compatibility with the matrix. This bonding enhancement technology results in more homogeneous compounds. Specialized coatings on fiber wear additives improves the bonding wherein additives may migrate to the surface and contact metal or plastic materials.

In various embodiments, the wear additives are subjected to plasma treatment to improve bonding in the elastomer/plastic matrix. Plasma treatments useful herein include treatments known in the art, wherein plasma interacts with the surface of the additive in a variety of ways. As used herein, plasma denotes a more or less ionized gas, a gaseous complex which may be composed of electrons, ions of either polarity, gaseous atoms and molecules in the ground or any higher state of any form of excitation. Low temperature plasmas contain high energy electrons and low energy species such as atoms, ions, and radicals. The electrons are able to cleave covalent bonds and induce subsequent reactions with the other plasma particles. Furthermore, ions, atoms and radicals are also able to interact with the surface to be treated. Depending on the plasma gas used, the surface characteristics fiber additives can be specifically modified for example by etching, plasma induced grafting, and/or plasma polymerization. Application of electromagnetic energy, such as microwaves, is an example of a low temperature plasma treatment. In addition to removing moisture and possibly other contaminates, plasma treatment also acts to increase the number of nucleation sites through the introduction of polar groups. This results in a coating with homogeneous surface morphology and less defects. In one embodiment, Kevlar® fiber, or a functionally equivalent high tensile strength aromatic aramid fiber, is pretreated with plasma to enhance adhesion in the bonding enhancement of the fiber wear additive to the elastomer/plastic matrix.

Various embodiments of the present invention use chemically treated or coated wear additives for bonding enhancement and to improve adhesion of the additives in a matrix. Application of silane or maleic anhydride based bonding agents to the surface of the wear additive is one non-limiting example of this chemical approach used to enhance compatibility with the elastomer/plastic matrix. Various embodiments include the use of epoxy silane coated calcium silicate (Nyad 10222). Other embodiments includes the use of silane coated Kevlar® fiber, or a functionally equivalent high tensile strength aromatic aramid fiber, for bonding enhancement.

The elastomer phase may be present in the form of particles in a continuous thermoplastic phase, as a 3-D network forming a co-continuous phase with the thermoplastic material, or as a mixture of both. The particles or 3-D network of the elastomer phase preferably have minimum dimensions of 10 μm or less, and more preferably 1 μm or less. Similarly, the wear additives may be present in a fiber form in a continuous thermoplastic phase, as a 3-D network forming a co-continuous phase with the thermoplastic material, or as a mixture of both. Preferably, the average fiber diameter is between about 0.01 to about 1,000 μm, more preferably, between about 0.1 to about 100 μm. In various embodiments, the fibers preferably have an aspect ratio length of about 1:1,000, more preferably about 1.5:50.

As previously discussed, the wear additive may also be present in a powder form. Likewise, the powder form additive may be present in the form of particles in a continuous thermoplastic phase, as a 3-D network forming a co-continuous phase with the thermoplastic material, or as a mixture of both. The powder form additive particles preferably have a particle size of between about 0.01 to about 1,000 μm, more preferably, between about 0.1 to about 100 μm.

Curative agent:

In various embodiments, the compositions of the present invention comprise a curative agent, to effect curing of the composition. Useful curative agents include diamines, peroxides, and polyol/onium salt combinations. Diamine curatives have been known since the 1950's. Diamine curatives are relatively slow curing, but offer advantages in several areas. Such curatives are commercially available, for example as Diak-1 from DuPont Dow Elastomers.

Preferred peroxide curative agents are organic peroxides, preferably dialkyl peroxides. In general, an organic peroxide may be selected to function as a curing agent for the composition in the presence of the other ingredients and under the temperatures to be used in the curing operation without causing any harmful amount of curing during mixing or other operations which are to precede the curing operation. A dialkyl peroxide which decomposes at a temperature above 49° C. is especially preferred when the composition is to be subjected to processing at elevated temperatures before it is cured. In many cases one will prefer to use a di-tertiarybutyl peroxide having a tertiary carbon atom attached to a peroxy oxygen. Non-limiting examples include 2,5-dimethyl-2,5-di (tert-butylperoxy)-3-hexyne; 2,5-dimethyl-2,5-di(tert-butylperoxy) hexane; and 1,3-bis-(t-butylperoxyisopropyl)benzene. Other non-limiting examples of peroxide curative agents include dicumyl peroxide, dibenzoyl peroxide, tertiary butyl perbenzoate, di[1,3-dimethyl-3-(t-butylperoxy)butyl] carbonate, and the like.

One or more crosslinking co-agents may be combined with the peroxide. Examples include triallyl cyanurate; triallyl isocyanurate; tri(methallyl)-isocyanurate; tris(diallylamine)-s-triazine, triallyl phosphite; N,N-diallyl acrylamide; hexaallyl phosphoramide; N,N,N',N'-tetraallyl terephthalamide; N,N,N',N'-tetraallyl malonamide; trivinyl isocyanurate; 2,4,6-trivinyl methyltrisiloxane; and tri(5-norbornene-2-methylene) cyanurate.

Suitable onium salts are described, for example, in U.S. Pat. Nos. 4,233,421; 4,912,171; and 5,262,490, each of which is incorporated by reference. Examples include triphenylbenzyl phosphonium chloride, tributyl alkyl phosphonium chloride, tributyl benzyl ammonium chloride, tetrabutyl ammonium bromide, and triarylsulfonium chloride.

Another class of useful onium salts is represented by the following formula:

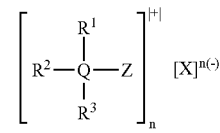

where
Q is nitrogen or phosphorus;
Z is a hydrogen atom or
is a substituted or unsubstituted, cyclic or acyclic alkyl group having from 4 to about 20 carbon atoms that is terminated with a group of the formula —COOA where A is a hydrogen atom or a $NH_4^+$ cation or Z is a group of the formula
—$CY_2$ COOR' where Y is a hydrogen or halogen atom, or is a substituted or unsubstituted alkyl or aryl group having from 1 to about 6 carbon atoms that may optionally contain one or more quaternary heteroatoms and where R' is a hydrogen atom, a $NH_4$+cation, an alkyl group, or is an acyclic anhydride, e.g., a group of the formula —COR where R is an alkyl group or is a group that itself contains organo-onium (i.e., giving a bis-organo-onium); preferably R' is hydrogen; Z may also be a substituted or unsubstituted, cyclic or acyclic alkyl group having from 4 to about 20 carbon atoms that is terminated with a group of the formula —COOA where A is a hydrogen atom or is a $NH_4^+$ cation;
$R_1$, $R_2$, and $R_3$ are each, independently, a hydrogen atom or an alkyl, aryl, alkenyl, or any combination thereof, each $R_1$, $R_2$, and $R_3$ can be substituted with chlorine, fluorine, bromine, cyano, —OR", or —COOR" where R" is a $C_1$ to $C_{20}$ alkyl, aryl, aralkyl, or alkenyl, and any pair of the $R_1$, $R_2$, and $R_3$ groups can be connected with each other and with Q to form a heterocyclic ring; one or more of the $R_1$, $R_2$, and $R_3$ groups may also be a group of the formula Z where Z is as defined above;

X is an organic or inorganic anion (for example, without limitation, halide, sulfate, acetate, phosphate, phosphonate, hydroxide, alkoxide, phenoxide, or bisphenoxide); and n is a number equal to the valence of the anion X.

The polyol crosslinking agents may be any of those polyhydroxy compounds known in the art to function as a crosslinking agent or co-curative for fluoroelastomers, such as those polyhydroxy compounds disclosed in U.S. Pat. No. 4,259,463 (Moggi et al.), U.S. Pat. No. 3,876,654 (Pattison), U.S. Pat. No. 4,233,421 (Worm), and U.S. Defensive Publication T107,801 (Nersasian). Preferred polyols incude aromatic polyhydroxy compounds, aliphatic polyhydroxy compounds, and phenol resins.

Representative aromatic polyhydroxy compounds include any one of the following: di-, tri-, and tetrahydroxybenzenes, -naphthalenes, and -anthracenes, and bisphenols of the Formula

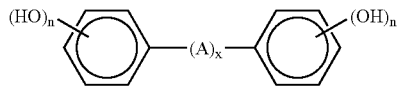

wherein A is a difunctional aliphatic, cycloaliphatic, or aromatic radical of 1 to 13 carbon atoms, or a thio, oxy, carbonyl, or sulfonyl radical, A is optionally substituted with at least one chlorine or fluorine atom, x is 0 or 1, n is 1 or 2, and any aromatic ring of the polyhydroxy compound is optionally substituted with at least one atom of chlorine, fluorine, or bromine atom, or carboxyl or an acyl radical (e.g., —COR, where R is H or a $C_1$ to $C_8$ alkyl, aryl or cycloalkyl group) or alkyl radical with, for example, 1 to 8 carbon atoms. It will be understood from the above bisphenol formula III that the —OH groups can be attached in any position (other than number one) in either ring. Blends of two or more such compounds can also be used. A preferred bisphenol compound is Bisphenol AF, which is 2,2-bis(4-hydroxyphenyl) hexafluoropropane. Other non-limiting examples include 4,4'-dihydroxydiphenyl sulfone (Bisphenol S) and 2,2-bis(4-hydroxyphenyl) propane (Bisphenol A). Aromatic polyhydroxy compound, such as hydroquinone may also be used as curative agents. Further non-limiting examples include catechol, resorcinol, 2-methyl resorcinol, 5-methyl resorcinol, 2-methyl hydroquinone, 2,5-dimethyl hydroquinone, and 2-t-butyl hydroquinone, 1,5-dihydroxynaphthalene and 9,10-dihydroxyanthracene.

Aliphatic polyhydroxy compounds may also be used as a polyol curative. Examples include fluoroaliphatic diols, e.g. 1,1,6,6-tetrahydrooctafluorohexanediol, and others such as those described in U.S. Pat. No. 4,358,559 (Holcomb et al.) and references cited therein. Derivatives of polyhydroxy compounds can also be used such as those described in U.S. Pat. No. 4,446,270 (Guenthner et al.) and include, for example, 2-(4-allyloxyphenyl)-2-(4-hydroxyphenyl)propane. Mixtures of two or more of the polyhydroxy compounds can be used.

Phenol resins capable of crosslinking a rubber polymer can be employed as the polyol curative agent. Reference to phenol resin may include mixtures of these resins. U.S. Pat. Nos. 2,972,600 and 3,287,440 are incorporated herein in this regard. These phenolic resins can be used to obtain the desired level of cure without the use of other curatives or curing agents.

Phenol resin curatives can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylolphenols or phenolic resins, substituted in para-positions with alkyl groups containing 1 to about 10 carbon atoms, are preferred. Useful commercially available phenol resins include alkylphenol-formaldehyde resin, and bromomethylated alkylphenol-formaldehyde resins.

In one embodiment, phenol resin curative agents may be represented by the general formula

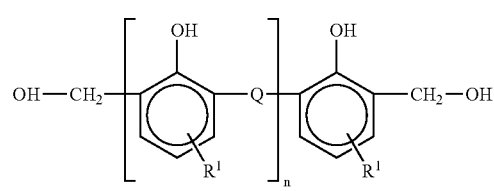

where Q is a divalent radical selected from the group consisting of —$CH_2$— and —$CH_2$—O—$CH_2$—; m is zero or a positive integer from 1 to 20 and R' is hydrogen or an organic radical. Preferably, Q is the divalent radical —$CH_2$—O—$CH_2$—, m is zero or a positive integer from 1 to 10, and R' is hydrogen or an organic radical having less than 20 carbon atoms. In another embodiment, preferably m is zero or a positive integer from 1 to 5 and R' is an organic radical having between 4 and 12 carbon atoms. Other preferred phenol resins are also defined in U.S. Pat. No. 5,952,425, which is incorporated herein by reference.

Optional Materials:

In various embodiments, plasticizers, extender oils, synthetic processing oils, or a combination thereof are used in the compositions of the invention. The type of processing oil selected will typically be consistent with that ordinarily used in conjunction with the specific rubber or rubbers present in the composition. The extender oils may include, but are not limited to, aromatic, naphthenic, and paraffinic extender oils. Preferred synthetic processing oils include polylinear α-olefins. The extender oils may also include organic esters, alkyl ethers, or combinations thereof. As disclosed in U.S. Pat. No. 5,397,832, it has been found that the addition of certain low to medium molecular weight organic esters and alkyl ether esters to the compositions of the invention lowers the Tg of the thermoplastic and rubber components, and of the overall composition, and improves the low temperatures properties, particularly flexibility and strength. These organic esters and alkyl ether esters generally have a molecular weight that is generally less than about 10,000. Particularly suitable esters include monomeric and oligomeric materials having an average molecular weight below about 2000, and preferably below about 600. In one embodiment, the esters may be either aliphatic mono- or diesters or alternatively oligomeric aliphatic esters or alkyl ether esters.

In addition to the elastomeric material, the thermoplastic polymeric material, wear packages, and curative, the processable rubber compositions of this invention may include other additives such as stabilizers, fillers, processing aids, curing accelerators, pigments, adhesives, tackifiers, waxes, and mixtures thereof. These additives may be added to the composition at various times, and may also be pre-mixed as a curative package. As used herein, a curative package may include any combination of additives as known in the art, or could simply only contain curing agent. The properties of the compositions and articles of the invention may be modified, either before or after vulcanization, by the addition of ingredients that are conventional in the compounding of rubber, thermoplastics, and blends thereof.

A wide variety of processing aids may be used, including plasticizers and mold release agents. Non-limiting examples of processing aids include Caranuba wax, phthalate ester plasticizers such as dioctylphthalate (DOP) and dibutylphthalate silicate (DBS), fatty acid salts such zinc stearate and sodium stearate, polyethylene wax, and keramide. In some embodiments, high temperature processing aids are preferred. Such include, without limitation, linear fatty alcohols such as blends of C10-C28 alcohols, organosilicones, and functionalized perfluoropolyethers. In some embodiments, the compositions contain about 1 to about 15% by weight processing aids, preferably about 5 to about 10% by weight.

Acid acceptor compounds are commonly used as curing accelerators or curing stabilizers. Preferred acid acceptor compounds include oxides and hydroxides of divalent metals. Non-limiting examples include Ca(OH)2, MgO, CaO, and ZnO.

Functional fillers useful herein include those selected from the group consisting of reinforcing fillers, lubricating fillers, thermal conductive fillers, electrical conductive fillers, physical extender fillers, and mixtures thereof. Fillers include both organic and inorganic fillers such as, barium sulfate, zinc sulfide, carbon black, silica, titanium dioxide, clay, talc, fiber glass, fumed silica and discontinuous fibers such as mineral fibers, wood cellulose fibers, carbon fiber, boron fiber, and aramid fiber, and mixtures thereof. Some non-limiting examples of processing additives added with the filler include stearic acid and lauric acid. In various embodiments, the compositions comprise filler from about 0.1 to about 50% by weight of the composition. Optionally, the compositions comprise from about 1 to about 40%, or from about 10 to about 30% of the filler.

Reinforcing fillers improve physical properties such as overall strength, hardness, abrasion resistance, compression set, tensile strength, tensile modulus and elongation at break. The reinforcing fillers can be either in fiber or powder form.

Some non-limiting examples of reinforcing fiber fillers include fumed silica, natural or synthetic fibers, glass fibers, carbon fibers, boron fibers, polyester, acrylic, colored pigments, polyimide, polyamide, and aramid fibers. Preferred reinforcing fibers include glass fibers, carbon fiber, and high tensile strength aromatic polyamide fibers.

Some non-limiting examples of reinforcing powder fillers may include carbon black powder, glass bead, polyimide powder, MoS2 powder, steel powder, brass powder, and aluminum powder. In one embodiment, the addition of carbon black, along with extender oil, preferably prior to dynamic vulcanization, is particularly preferred. Non-limiting examples of carbon black fillers include SAF black, HAF black, SRP black and Austin black. Carbon black improves the tensile strength, and an extender oil can improve processability, the resistance to oil swell, heat stability, hysteresis, cost, and permanent set.

The addition of lubricating fillers improves the abrasion and wear characteristics of the fluorocarbon elastomers. Lubricating fillers, as used herein, include materials having characteristic crystalline habit, which may cause the filler material to shear into thin, flat plates operable to readily slide over one another, thus having an antifriction or lubricating effect. Some non-limiting examples of lubricating fillers include PTFE powder, silicon powder, and graphite powder. The lubricating fillers include solid and synthetic lubricants.

The addition of conductive fillers enhances the thermal and electrical conductivity properties of the fluorocarbon elastomers. Conductive fillers, as used herein, include materials operable to enable the transfer or heat or electric current from one substance to another when the two substances are in contact with one another. Crystalline solids are good thermal and electrical conductors, especially metals and alloys. Non-limiting examples of conductive fillers include carbon fiber or powder, aluminum powder, brass powder, steel powder, and other conductive metals.

The addition of a simple physical extender fillers stabilizes the fluorocarbon elastomer compound and improves the dispersion of elastomers and plastic phases. Extender fillers, as used herein, include inert, low-gravity materials that can be added to the compound to increase bulk and reduce cost per unit volume. Some non-limiting examples include kaolin (clay), mica and talc powder.

In various embodiments, certain functional fillers, such as glass fiber, carbon fiber, Kevlar® fiber, boron fiber, PTFE fiber and other ceramic fibers, may exhibit compatibility issues with elastomers, plastics, and elastomer/plastic compounds, including thermoplastic vulcanizate compositions containing cured fluorocarbon elastomers. Poor adherence to the matrix may yield undesirable physical properties. Therefore, in various embodiments, the filler surfaces are modified with surface treatments such as the plasma treatment and chemical treatments, as previously discussed, to improve the effectiveness of the fillers.

In preferred embodiments, the compositions contain 35% by weight or more, and preferably 40% by weight or more of the elastomer phase, based on the total weight of elastomer and thermoplastic material. In other embodiments, the compositions contain about 50% by weight or more of the elastomer phase. In preferred embodiments, the compositions may further contain from about 5% to about 50% by weight functional filler material, preferably from about 20% to about 30% by weight, based on the total weight of the vulcanized elastomeric material, thermoplastic material and functional filler material combined.

The compositions are homogenous blends of two phases that are sufficiently compatible that the compositions may readily be formed into shaped articles having sufficient elastomer properties, such as tensile strength, modulus, elongation at break, and compression set to be industrially useful as seals, gaskets, O-rings, hoses, and the like. In one aspect, the rubber compositions are made of two-phases where the matrix forms a continuous phase, the vulcanized elastomeric material is in the form of particles forming a non-continuous, disperse, or discrete phase, and the wear additive is dispersed in the matrix. In another aspect, the elastomeric material, wear additives, and the matrix form co-continuous phases.

In particular embodiments, shaped articles made from the processable compositions typically exhibit a Shore A hardness of about 50 or more, preferably about 70 or more, typically in the range of from about 70 to about 90. In addition or alternatively, the tensile strength of the shaped articles will preferably be about 4 MPa or greater, preferably about 8 MPa or greater, typically about from about 8 to about 13 MPa. In still other embodiments, shaped articles may be characterized as having a modulus at 100% of at least about 2 MPa, preferably at least about about 4 MPa, and typically in the range of from about 4 to about 8 MPa. In other embodiments, elongation at break of articles made from the processable compositions of the invention will be about 10% or greater, preferably at least about 50%, more preferably at least about 150%, and typically in the range of from about 150 to about 300%. Shaped articles of the invention may be characterized as having at least one of hardness, tensile strength, modulus, and elongation at break in the above noted ranges.

Methods of Manufacture:

The rubber composition of the invention may be made by dynamic vulcanization of a fluorocarbon elastomer in the presence of a thermoplastic component and wear additives. In various embodiments discussed in more detail below, methods are provided for making the rubber composition, comprising combining a curative agent, an elastomeric material, a thermoplastic material and at least one wear additive to form a mixture. The mixture is heated at a temperature and for a time sufficient to effect vulcanization or cure of the fluorocarbon elastomer in the presence of the wear additive and thermoplastic material. Mechanical energy is applied to the mixture of elastomeric material, curative agent, wear additive and thermoplastic material during the heating step. Thus the methods of the invention provide for mixing the elastomer, wear additive, and thermoplastic components in the presence of a curative agent and heating during the mixing to effect cure of the elastomeric component. Alternatively, the elastomeric material and thermoplastic material may be mixed for a time and at a shear rate sufficient to form a dispersion of the elastomeric material in a continuous or co-continuous thermoplastic phase with the wear additives. Thereafter, a curative agent may be added to the dispersion of elastomeric material, thermoplastic material, and wear additives while continuing the mixing. Finally, the dispersion is heated while continuing to mix to produce the processable rubber composition of the invention.

The compositions of the invention are readily processable by conventional plastic processing techniques. In various embodiments, shaped articles are provided comprising the cured fluorocarbon elastomers, and wear additives dispersed in discrete phases and in the thermoplastic matrix. Shaped articles of the invention include, without limitation, seals, O-rings, gaskets, and hoses.

In a preferred embodiment, shaped articles having wear additives prepared from the compositions of the present invention exhibit an advantageous set of physical properties that includes a high degree of resistance to the effects of physical wearing, including the resistance to the effects of chemical solvents. In these embodiments, it is possible to provide articles for which the hardness, tensile strength, and/or the elongation at break change very little or change significantly less than comparable cured fluorocarbon elastomers or other known thermoplastic vulcanizates, when the articles are exposed for extended periods of time such as by immersion or partial immersion in organic solvents or fuels.

The fluorocarbon elastomer undergoes dynamic vulcanization in the presence of thermoplastic non-curing polymers to provide compositions with desirable rubber-like properties, but that can be thermally processed by conventional thermoplastic methods such as extrusion, blow molding, and injection molding. The elastomers are generally synthetic, non-crystalline polymers that exhibit rubber-like properties when crosslinked, cured, or vulcanized. As such, the cured elastomers, as well as the compositions of the invention made by dynamic vulcanization of the elastomers, are observed to substantially recover their original shape after removal of a deforming force, and show reversible elasticity up to high strain levels.

The vulcanized elastomeric material, also referred to herein generically as a "rubber", is generally present as small particles within a continuous thermoplastic polymer matrix. A co-continuous morphology is also possible depending on the amount of elastomeric material relative to thermoplastic material, the wear additives, the cure system, fillers, and the mechanism and degree of cure of the elastomer and the amount and degree of mixing. Preferably, the elastomeric material is fully crosslinked/cured.

Full crosslinking can be achieved by adding an appropriate curative or curative system to a blend of thermoplastic material and elastomeric material, and vulcanizing or curing the rubber to the desired degree under vulcanizing conditions. In a preferred embodiment, the elastomer is crosslinked by the process of dynamic vulcanization. The term dynamic vulcanization refers to a vulcanization or curing process for a rubber (here a fluorocarbon elastomer) contained in a thermoplastic composition, wherein the curable rubber is vulcanized under conditions of sufficiently high shear at a temperature above the melting point of the thermoplastic component. The rubber is thus simultaneously crosslinked and dispersed within the thermoplastic matrix. Dynamic vulcanization is effected by applying mechanical energy to mix the elastomeric and thermoplastic components at elevated temperature in the presence of a curative in conventional mixing equipment such as roll mills, Moriyama mixers, Banbury mixers, Brabender mixers, continuous mixers, mixing extruders such as single and twin-screw extruders, and the like. An advantageous characteristic of dynamically cured compositions is that, notwithstanding the fact that the elastomeric component is fully cured, the compositions can be processed and reprocessed by conventional plastic processing techniques such as extrusion, injection molding and compression molding. Scrap or flashing can be salvaged and reprocessed.

Heating and mixing or mastication at vulcanization temperatures are generally adequate to complete the vulcanization reaction in a few minutes or less, but if shorter vulcanization times are desired, higher temperatures and/or higher shear may be used. A suitable range of vulcanization temperature is from about the melting temperature of the thermoplastic material (typically about 120° C.) to about 300° C. or more. Typically, the range is from about 150° C. to about 250° C. A preferred range of vulcanization temperatures is from about 180° C. to about 220° C. It is preferred that mixing continue without interruption until vulcanization occurs or is complete.

If appreciable curing is allowed after mixing has stopped, an unprocessable thermoplastic vulcanizate may be obtained. In this case, a kind of post curing step may be carried out to complete the curing process. In some embodiments, the post curing takes the form of continuing to mix the elastomer and thermoplastic during a cool-down period.

After dynamic vulcanization, a homogeneous mixture is obtained, wherein the rubber is in the form of small dispersed particles essentially of an average particle size smaller than about 50 μm, preferably of an average particle size smaller than about 25 μm. More typically and preferably, the particles have an average size of about 10 μm or less, preferably about 5 μm or less, and more preferably about 1 μm or less. In other embodiments, even when the average particle size is larger, there will be a significant number of cured elastomer particles less than 1 μm in size dispersed in the thermoplastic matrix.

The size of the particles referred to above may be equated to the diameter of spherical particles, or to the diameter of a sphere of equivalent volume. It is to be understood that not all particles will be spherical. Some particles will be fairly isotropic so that a size approximating a sphere diameter may be readily determined. Other particles may be anisotropic in that one or two dimensions may be longer than another dimension. In such cases, the preferred particle sizes referred to above correspond to the shortest of the dimensions of the particles.

In some embodiments, the cured elastomeric material is in the form of particles forming a dispersed, discrete, or non-continuous phase wherein the particles are separated from one another by the continuous phase made up of the thermoplastic matrix. Such structures are expected to be more favored at relatively lower loadings of cured elastomer, i.e. where the thermoplastic material takes up a relatively higher volume of the compositions. In other embodiments, the cured material may be in the form of a co-continuous phase with the thermoplastic material. Such structures are believed to be favored at relatively higher volume of the cured elastomer. At intermediate elastomer loadings, the structure of the two-phase compositions may take on an intermediate state in that some of the cured elastomer may be in the form of discrete particles and some may be in the form of a co-continuous phase.

The homogenous nature of the compositions, the small particle size indicative of a large surface area of contact between the phases, and the ability of the compositions to be formed into shaped articles having sufficient hardness, tensile strength, modulus, elongation at break, or compression set to be useful in industrial applications, indicate a relatively high degree of compatibility between the elastomer and thermoplastic phases. It is believed such compatibility results from the dynamic vulcanization process and inclusion of wear additives. During the process, the elastomeric particles are being crosslinked or cured while the two phases are being actively mixed and combined. In addition, the higher temperature and the presence of reactive crosslinking agent may lead to some physical or covalent linkages between the two phases. At the same time, the process leads to a finer dispersion of the discrete or co-continuous elastomer phase in the thermoplastic than is possible with simple filling.

The progress of the vulcanization may be followed by monitoring mixing torque or mixing energy requirements during mixing. The mixing torque or mixing energy curve generally goes through a maximum after which mixing can be continued somewhat longer to improve the fabricability of the blend. If desired, one can add additional ingredients, such as the stabilizer package, after the dynamic vulcanization is complete. The stabilizer package is preferably added to the thermoplastic vulcanizate after vulcanization has been essentially completed, i.e., the curative has been essentially consumed.

The processable rubber compositions of the present invention may be manufactured in a batch process or a continuous process.

In a batch process, predetermined charges of elastomeric material, thermoplastic material, wear packages and curative agents, or a curative package, are added to a mixing apparatus and manufactured in a single operation as follows. In a typical batch procedure, the thermoplastic material is added to a mixer and the temperature is elevated to between about 150° C. and about 350° C., depending on the specific thermoplastic used. A thermoplastic wear package is added, and the combination is mixed, blended, masticated or otherwise physically combined for about 5 to about 10 minutes, or until uniformly mixed. An elastomer is then added to the thermoplastic and thermoplastic wear package, and is mixed to a homogeneous state at the elevated temperature. When the structure of the elastomeric material is as desired, an elastomer wear package is added while continuing to apply mechanical energy to mix the elastomeric material and thermoplastic material for another 5 to about 10 minutes, or until uniformly mixed. An elastomer curing package is added to the molten homogeneous mixture. Curing is effected by continued mixing and heating at the elevated temperature. The curing process may take an additional 5 to about 15 minutes, or longer to complete. Typically the combination is mixed until the torque level of the mixer reaches steady state. When the desired level of cure is complete, the fully or partially cured processable rubber composition may be discharged or removed from the reaction vessel (mixing chamber) for further processing which may include grinding or pulverizing the composition into small size pellets, approximately about 1-3 mm in diameter, for use in injection molding, extrusion processes, etc.

It is preferred to mix the elastomeric material and thermoplastic material at a temperature where the thermoplastic material softens and flows. If such a temperature is below that at which the curative agent is activated, the curative agent may be a part of the mixture during the initial particle dispersion step of the batch process. In some embodiments, a curative is combined with the elastomeric and polymeric material at a temperature below the curing temperature. When the desired dispersion is achieved, the respective wear packages can be added and the temperature may be increased to effect cure. In one embodiment, commercially available elastomeric materials are used that contain a curative pre-formulated into the elastomer. However, if the curative agent is activated at the temperature of initial mixing, it is preferred to leave out the curative until the desired particle size distribution of the elastomeric material in the thermoplastic matrix is achieved. In another embodiment, curative is added after the elastomeric and thermoplastic material are mixed. In a preferred embodiment, the curative agent is added to a mixture of elastomeric particles in thermoplastic material while the entire mixture continues to be mechanically stirred, agitated or otherwise mixed. Further, it is preferred to add fibrous material, if any, as late in the process as feasible, thus minimizing and avoiding unnecessary breakage of fibers during the mixing action.

Continuous processes may also be used to prepare the processable rubber compositions of the invention. In a preferred embodiment, a twin screw extruder apparatus, either co-rotation or counter-rotation screw type, is provided with ports for material addition and reaction chambers made up of modular components of the twin screw apparatus. In a typical continuous procedure, thermoplastic material, preferably in pellet form, is inserted into a heated melting zone of a twin screw extruder using a first hopper or feeder (loss-in-weight or volumetric feeder). A thermoplastic wear package is added to the hopper and is homogeneously mixed with the thermoplastic pellets in the twin screw extruder barrel. The elastomer, preferably pelletized into 1-2 mm diameter pellets, is added using a first side feeding hopper. The elastomer is mixed with the thermoplastic and thermoplastic wear package at an elevated temperature between about 150° C. and about 350° C., depending on the specific thermoplastic used. Then, at a downstream port, by using second side feeder (loss-in-weight or volumetric feeder), the elastomer wear package is added to the mixture through a feeding hopper, along with the curative agent, or curative package. Downstream of the second additive port, the mixing parameters and transit time may be varied and continue until the combination is fully mixed and cured. A typical residence time is from about 10 to about 15 minutes in the barrel operating from about 150 to about 200 rpm.

It should be understood that the temperature and screw parameters may be adjusted to provide a proper temperature and shear to effect the desired mixing and particle size distribution of an uncured elastomeric component in a thermoplastic material matrix. The duration of mixing may be controlled by providing a longer or shorter length of extrusion apparatus or by controlling the speed of screw rotation for the mixture of elastomeric material and thermoplastic material to go through during the mixing phase. The degree of mixing may also be controlled by the mixing screw element configuration in the screw shaft, such as intensive, medium or mild screw designs.

The addition of wear additives, especially fiber additives, is preferred at the downstream feeding section to minimize the breakage of fibers during the high shearing mixing action of the twin-screw extrusion. By adjusting the shear rate, temperature, duration of mixing, mixing screw element configuration, as well as the time of adding the curative agent, or curative package, processable rubber compositions of the invention may be made in a continuous process. As in the batch process, the elastomeric material may be commercially formulated to contain a curative agent, generally a phenol or phenol resin curative.

The compositions and articles of the invention will contain a sufficient amount of vulcanized elastomeric material ("rubber") to form a rubbery composition of matter, that is, they will exhibit a desirable combination of flexibility, softness, and compression set. Preferably, the compositions should comprise at least about 25 parts by weight rubber, preferably at least about 35 parts by weight rubber, more preferably at least about 40 parts by weight rubber, even more preferably at least about 45 parts by weight rubber, and still more preferably at least about 50 parts by weight rubber per 100 parts by weight of the rubber and thermoplastic polymer combined. The amount of cured rubber within the thermoplastic vulcanizate is generally from about 5 to about 95 percent by weight, preferably from about 35 to about 95 percent by weight, more preferably from about 40 to about 90 weight percent, and more preferably from about 50 to about 80 percent by weight of the total weight of the rubber and the thermoplastic polymer combined.

The amount of thermoplastic polymer within the processable rubber compositions of the invention is generally from about 5 to about 95 percent by weight, preferably from about 10 to about 65 percent by weight and more preferably from about 20 to about 50 percent by weight of the total weight of the rubber and the thermoplastic combined.

As noted above, the processable rubber compositions and shaped articles of the invention include a cured rubber, at least one wear additive, and a thermoplastic polymer. Preferably, the thermoplastic vulcanizate is a homogeneous mixture wherein the rubber is in the form of finely-divided and well-dispersed rubber particles within a non-vulcanized matrix. It should be understood, however, that the thermoplastic vulcanizates of the this invention are not limited to those containing discrete phases inasmuch as the compositions of this invention may also include other morphologies such as co-continuous morphologies. In especially preferred embodiments, the rubber particles have an average particle size smaller than about 50 µm, more preferably smaller than about 25 µm, even more preferably smaller than about 10 µm or less, and still more preferably smaller than about 5 µm.

Advantageously, the shaped articles of the invention are rubber-like materials that, unlike conventional rubbers, can be processed and recycled like thermoplastic materials. These materials are rubber like to the extent that they will retract to less than 1.5 times their original length within one minute after being stretched at room temperature to twice its original length and held for one minute before release, as defined in ASTM D1566. Also, these materials satisfy the tensile set requirements set forth in ASTM D412, and they also satisfy the elastic requirements for compression set per ASTM D395.

The reprocessability of the rubber compositions of the invention may be exploited to provide a method for reducing the costs of a manufacturing process for making shaped rubber articles. The method involves recycling scrap generated during the manufacturing process to make other new shaped articles. Because the compositions of the invention and the shaped articles made from the compositions are thermally processable, scrap may readily be recycled for re-use by collecting the scrap, optionally cutting, shredding, grinding, milling, otherwise comminuting the scrap material, and re-processing the material by conventional thermoplastic techniques. Techniques for forming shaped articles from the recovered scrap material are in general the same as those used to form the shaped articles—the conventional thermoplastic techniques include, without limitation, blow molding, injection molding, compression molding, and extrusion.

The re-use of the scrap material reduces the costs of the manufacturing process by reducing the material cost of the method. Scrap may be generated in a variety of ways during a manufacturing process for making shaped rubber articles. For example, off-spec materials may be produced. Even when on-spec materials are produced, manufacturing processes for shaped rubber articles tend to produce waste, either through inadvertence or through process design, such as the material in sprues of injection molded parts. The re-use of such materials through recycling reduces the material and thus the overall costs of the manufacturing process.

For thermoset rubbers, such off spec materials usually can not be recycled into making more shaped articles, because the material can not be readily re-processed by the same techniques as were used to form the shaped articles in the first place. Recycling efforts in the case of thermoset rubbers are usually limited to grinding up the scrap and the using the grinds as raw material in a number products other than those produced by thermoplastic processing technique The present invention is further illustrated through the following non-limiting examples.

EXAMPLES

In Examples 1-9, the following materials are used:

Dyneon FE 5840 is a terpolymer elastomer of VDF/HFP/TFE, from Dyneon (3M).

Dyneon BRE 7231X is a base resistant elastomer, based on a terpolymer of TFE, propylene, and VDF, commercially available from Dyneon (3M).

Dyneon THV 815X is a fluorothermoplastic polymer of tetrafluoroethylene, hexafluoropropylene and vinylidene fluoride from Dyneon (3M).

Hylar MP-10 is a high performance melt-processable polyvinylidene fluoride homopolymer.

Rhenofit CF is a calcium hydroxide crosslinker for fluoroelastomers, from Rhein Chemie.

Elastomag 170 is a high activity powdered magnesium oxide from Rohm and Haas.

Struktol WS-280 is a silane coupling agent from Struktol.

Tecnoflon FPA-1 is a functionalized perfluoropolyether in wax form from Solvay Solexis.

MT Black (N990) is carbon black.

Halar 500 LC is a partially fluorinated semi-crystalline copolymer of ethylene and chlorotrifluoroethylene from Solvay Solexis.

Austin Black is carbon black.

Nyad 400 and 10222 and Wollastocoat contain treated and untreated wollastonite, a naturally occurring calcium meta-silicate ($CaSiO_3$) from NYCO Minerals Inc.

TAIC is a symmetric polyfunctions triazine compound.

Tecnoflon P457 and P757 are low viscosity fluoroelastomers from Solvay Solexis.

Tecnoflon FOR 50 HS and FOR 80 HS are cure incorporated fluoroelastomers from Solvay Solexis.

Luperco 101 XL is a peroxide from the Pennwalt Corporation.

ZnO is zinc oxide, which acts as an acid accepting curing accelerator.

Kynar Flex 2500-20 is a polyvinylidene fluoride based fluoropolymer available from ATOFINA Chemicals, Inc.

PTFE (F-5) Powder is a poly tetrafluoroethylene resin in powder form.

PFA is a copolymer of tetrafluoroethylene and perfluoropropyl vinyl ether.

Graphite FX4467 is a natural crystalline vein graphite available from FormulaFX Products.

Examples 1-9 demonstrate dynamic vulcanization of copolymers of tetrafluoroethylene and propylene in the presence of a variety of thermoplastic elastomers and semicrystalline thermoplastic materials. Example 1 is carried out in a Moriyama mixer, while examples 2-9 are carried out in a Brabender mixer. Example 2 uses peroxide curable fluorocarbon elastomer with an elastomer wear package. Example 3 uses peroxide curable fluorocarbon elastomer with elastomer and thermoplastic wear packages. Examples 4-6 use bisphenol curable fluorocarbon elastomer with an elastomer wear package. Examples 7-9 use bisphenol curable fluorocarbon elastomer with elastomer and thermoplastic wear packages. The Dyneon and Tecnoflon fluoroelastomers are used at a level of 100 parts, and the other materials are used at levels between 1 parts per hundred Dyneon or Tecnoflon to 25 parts per hundred parts of the Dyneon or Tecnoflon material. For example, 100 pphr would represent an equal amount of material and fluoroelastomer.

To demonstrate a batch process, the ingredients are mixed in a Brabender mixer according to the following procedure. The thermoplastic material is melted in a Brabender mixer and stirred with the thermoplastic wear additive. To the molten stirring thermoplastic material is added the Dyneon or Tecnoflon, along with the elastomer wear additives. Mixing continues at the melting point of the thermoplastic material for a further 10-20 minutes, preferably at a temperature of about 120-350° C. Then, the curing accelerators are added and the mixing and heating continued for a further 10 minutes. The vulcanized material is cooled down and removed from the Brabender mixer. Shaped articles may be prepared from the vulcanized composition by conventional compression molding, injection molding, extrusion, and the like. Plaques may be fabricated from the vulcanized composition for measurement of physical properties.

| Ingredient | Example 1a pphr | g | Example 1b pphr | g | Example 1c pphr | g | Example 1d pphr | g | Example 1e pphr | g |
|---|---|---|---|---|---|---|---|---|---|---|
| Dyneon FE5840 | 70.0 | 2594.1 | 70.0 | 2281.5 | 70.0 | 2784.8 | 70.0 | 2427.8 | 70.0 | 2427.8 |
| Dyneon BRE 7231X | 30.0 | 1111.8 | 30.0 | 977.8 | 30.0 | 1193.5 | 30.0 | 1040.5 | 30.0 | 1040.5 |
| Hylar MP-10 | 25.0 | 926.5 | 25.0 | 814.8 | 25.0 | 994.6 | 25.0 | 867.1 | | |
| Rhenofit CF | 6.0 | 222.4 | 6.0 | 195.6 | 6.0 | 238.7 | 6.0 | 208.1 | 6.0 | 208.1 |
| Elastomag 170 | 3.0 | 111.2 | 3.0 | 97.8 | 3.0 | 119.3 | 3.0 | 104.0 | 3.0 | 104.00 |
| Struktol WS-280 | 1.0 | 37.1 | 1.0 | 32.6 | 1.0 | 39.8 | 1.0 | 34.7 | 1.0 | 34.7 |
| Austin Black | 10.00 | 370.6 | 10.00 | 325.9 | | | | | | |
| Tecnoflon FPA-1 | 1.00 | 37.1 | 1.00 | 32.6 | 1.00 | 39.8 | 1.00 | 34.7 | 1.00 | 34.7 |
| Graphite 4467 | | | 5.00 | 163.0 | | | 5.00 | 173.4 | 5.00 | 173.4 |
| Nyad 400 | | | 10.00 | 325.9 | | | 10.00 | 346.8 | 10.00 | 346.8 |
| 400 Wollastocoat 10222 | | | 5.00 | 163.0 | | | 5.00 | 173.4 | 5.00 | 173.4 |
| Halar 500LC | | | | | | | | | 25.00 | 867.1 |

| Ingredient | Example 2a pphr | g | Example 2b pphr | g | Example 2c pphr | g | Example 2d pphr | g | Example 2e pphr | g |
|---|---|---|---|---|---|---|---|---|---|---|
| Tecnoflon P457 | 100.0 | 231.4 | 100.0 | 231.4 | | | | | 100.0 | 231.4 |
| Tecnoflon P757 | | | | | 100.0 | 231.4 | 100.0 | 231.4 | | |
| Luperco 101 XL | 3.0 | 6.9 | 3.0 | 6.9 | 3.0 | 6.9 | 3.0 | 6.9 | 3.0 | 6.9 |
| TAIC, 75% Dispersion | 4.00 | 9.3 | 4.00 | 9.3 | 4.00 | 9.3 | 4.00 | 9.3 | 4.00 | 9.3 |
| ZnO | 5.00 | 11.6 | 5.00 | 11.6 | 5.00 | 11.6 | 5.00 | 11.6 | 5.00 | 11.6 |
| MT N-990 Carbon Black | 10.00 | 23.1 | 10.00 | 23.1 | 10.00 | 23.1 | 10.00 | 23.1 | 10.00 | 23.1 |
| Hylar MP-10 | 25.00 | 57.9 | | | 25.00 | 57.9 | | | 12.50 | 28.9 |
| Kynar Flex 2500-20 | | | 25.00 | 57.9 | | | 25.00 | 57.9 | 12.50 | 28.9 |
| Graphite 4467 | 5.00 | 11.6 | 5.00 | 11.6 | 5.00 | 11.6 | 5.00 | 11.6 | 5.00 | 11.6 |
| Nyad 400 | 10.00 | 23.1 | 10.00 | 23.1 | 10.00 | 23.1 | 10.00 | 23.1 | 10.00 | 23.1 |
| 400 Wollastocoat 10222 | 5.00 | 11.6 | 5.00 | 11.6 | 5.00 | 11.6 | 5.00 | 11.6 | 5.00 | 11.6 |

| Ingredient | Example 3a pphr | g | Example 3b pphr | g | Example 3c pphr | g | Example 3d pphr | g | Example 3e pphr | g |
|---|---|---|---|---|---|---|---|---|---|---|
| Tecnoflon P457 | 100.0 | 224.7 | 100.0 | 224.7 | | | | | 100.0 | 224.7 |
| Tecnoflon P757 | | | | | 100.0 | 224.7 | 100.0 | 224.7 | | |
| Luperco 101 XL | 3.0 | 6.7 | 3.0 | 6.7 | 3.0 | 6.7 | 3.0 | 6.7 | 3.0 | 6.7 |
| TAIC, 75% Dispersion | 4.00 | 9.0 | 4.00 | 9.0 | 4.00 | 9.0 | 4.00 | 9.0 | 4.00 | 9.0 |
| ZnO | 5.00 | 11.2 | 5.00 | 11.2 | 5.00 | 11.2 | 5.00 | 11.2 | 5.00 | 11.2 |
| MT N-990 Carbon Black | 10.00 | 22.5 | 10.00 | 22.5 | 10.00 | 22.5 | 10.00 | 22.5 | 10.00 | 22.5 |
| Hylar MP-10 | 25.00 | 56.2 | | | 25.00 | 56.2 | | | 12.50 | 28.1 |
| Kynar Flex 2500-20 | | | 25.00 | 56.2 | | | 25.00 | 56.2 | 12.50 | 28.1 |
| Graphite 4467 | 5.00 | 11.2 | 5.00 | 11.2 | 5.00 | 11.2 | 5.00 | 11.2 | 5.00 | 11.2 |
| Nyad 400 | 10.00 | 22.5 | 10.00 | 22.5 | 10.00 | 22.5 | 10.00 | 22.5 | 10.00 | 22.5 |

-continued

| | | |
|---|---|---|
| 400 Wollastocoat 10222 | 5.00 11.2 | 5.00 11.2 | 5.00 11.2 | 5.00 11.2 | 5.00 11.2 |
| PTFE (F-5) Powder | 5.00 11.2 | 5.00 11.2 | 5.00 11.2 | 5.00 11.2 | 5.00 11.2 |

| | Example 4a | | Example 4b | | Example 4c | | Example 4d | | Example 4e | |
|---|---|---|---|---|---|---|---|---|---|---|
| Ingredient | pphr | g | pphr | g | pphr | g | pphr | g | pphr | g |
| Dyneon FE5840 | 70.0 | 163.0 | 70.0 | 163.0 | 70.0 | 163.0 | 70.0 | 163.0 | 70.0 | 163.0 |
| Dyneon BRE 7231X | 30.0 | 69.8 | 30.0 | 69.8 | 30.0 | 69.8 | 30.0 | 69.8 | 30.0 | 69.8 |
| Hylar MP-10 | 25.0 | 58.2 | | | | | | | | |
| Rhenofit CF | 6.0 | 14.0 | 6.0 | 14.0 | 6.0 | 14.0 | 6.0 | 14.0 | 6.0 | 14.0 |
| Elastomag 170 | 3.0 | 7.0 | 3.0 | 7.0 | 3.0 | 7.0 | 3.0 | 7.0 | 3.0 | 7.0 |
| Struktol WS-280 | 1.0 | 2.3 | 1.0 | 2.3 | 1.0 | 2.3 | 1.0 | 2.3 | 1.0 | 2.3 |
| Austin Black | 10.00 | 23.3 | 10.00 | 23.3 | 10.00 | 23.3 | 10.00 | 23.3 | 10.00 | 23.3 |
| Tecnoflon FPA-1 | 1.00 | 2.3 | 1.00 | 2.3 | 1.00 | 2.3 | 1.00 | 2.3 | 1.00 | 2.3 |
| Graphite 4467 | 5.00 | 11.6 | 5.00 | 11.6 | 5.00 | 11.6 | 5.00 | 11.6 | 5.00 | 11.6 |
| Nyad 400 | 10.00 | 23.3 | 10.00 | 23.3 | 10.00 | 23.3 | 10.00 | 23.3 | 10.00 | 23.3 |
| 400 Wollastocoat 10222 | 5.00 | 11.6 | 5.00 | 11.6 | 5.00 | 11.6 | 5.00 | 11.6 | 5.00 | 11.6 |
| Halar 500LC | | | 25.00 | 58.2 | | | | | | |
| Kynar Flex 2500-20 | | | | | 25.00 | 58.2 | | | 12.50 | 29.1 |
| Dyneon THV 815X | | | | | | | 25.00 | 58.2 | | |
| PFA | | | | | | | | | 12.50 | 29.1 |

| | Example 5a | | Example 5b | | Example 5c | | Example 5d | | Example 5e | |
|---|---|---|---|---|---|---|---|---|---|---|
| Ingredient | pphr | g | pphr | g | pphr | g | pphr | g | pphr | g |
| Tecnoflon 50 HS | 100.0 | 232.8 | 100.0 | 232.8 | 100.0 | 232.8 | 100.0 | 232.8 | 100.0 | 232.8 |
| Hylar MP-10 | 25.0 | 58.2 | | | | | | | | |
| Rhenofit CF | 6.0 | 14.0 | 6.0 | 14.0 | 6.0 | 14.0 | 6.0 | 14.0 | 6.0 | 14.0 |
| Elastomag 170 | 3.0 | 7.0 | 3.0 | 7.0 | 3.0 | 7.0 | 3.0 | 7.0 | 3.0 | 7.0 |
| Struktol WS-280 | 1.0 | 2.3 | 1.0 | 2.3 | 1.0 | 2.3 | 1.0 | 2.3 | 1.0 | 2.3 |
| Austin Black | 10.00 | 23.3 | 10.00 | 23.3 | 10.00 | 23.3 | 10.00 | 23.3 | 10.00 | 23.3 |
| Tecnoflon FPA-1 | 1.00 | 2.3 | 1.00 | 2.3 | 1.00 | 2.3 | 1.00 | 2.3 | 1.00 | 2.3 |
| Graphite 4467 | 5.00 | 11.6 | 5.00 | 11.6 | 5.00 | 11.6 | 5.00 | 11.6 | 5.00 | 11.6 |
| Nyad 400 | 10.00 | 23.3 | 10.00 | 23.3 | 10.00 | 23.3 | 10.00 | 23.3 | 10.00 | 23.3 |
| 400 Wollastocoat 10222 | 5.00 | 11.6 | 5.00 | 11.6 | 5.00 | 11.6 | 5.00 | 11.6 | 5.00 | 11.6 |
| Halar 500LC | | | 25.00 | 58.2 | | | | | | |
| Kynar Flex 2500-20 | | | | | 25.00 | 58.2 | | | 12.50 | 29.1 |
| Dyneon THV 815X | | | | | | | 25.00 | 58.2 | | |
| PFA | | | | | | | | | 12.50 | 29.1 |

| | Example 6a | | Example 6b | | Example 6c | | Example 6d | | Example 6e | |
|---|---|---|---|---|---|---|---|---|---|---|
| Ingredient | pphr | g | pphr | g | pphr | g | pphr | g | pphr | g |
| Tecnoflon 80 HS | 100.0 | 232.8 | 100.0 | 232.8 | 100.0 | 232.8 | 100.0 | 232.8 | 100.0 | 232.8 |
| Hylar MP-10 | 25.0 | 58.2 | | | | | | | | |
| Rhenofit CF | 6.0 | 14.0 | 6.0 | 14.0 | 6.0 | 14.0 | 6.0 | 14.0 | 6.0 | 14.0 |
| Elastomag 170 | 3.0 | 7.0 | 3.0 | 7.0 | 3.0 | 7.0 | 3.0 | 7.0 | 3.0 | 7.0 |
| Struktol WS-280 | 1.0 | 2.3 | 1.0 | 2.3 | 1.0 | 2.3 | 1.0 | 2.3 | 1.0 | 2.3 |
| Austin Black | 10.00 | 23.3 | 10.00 | 23.3 | 10.00 | 23.3 | 10.00 | 23.3 | 10.00 | 23.3 |
| Tecnoflon FPA-1 | 1.00 | 2.3 | 1.00 | 2.3 | 1.00 | 2.3 | 1.00 | 2.3 | 1.00 | 2.3 |
| Graphite 4467 | 5.00 | 11.6 | 5.00 | 11.6 | 5.00 | 11.6 | 5.00 | 11.6 | 5.00 | 11.6 |
| Nyad 400 | 10.00 | 23.3 | 10.00 | 23.3 | 10.00 | 23.3 | 10.00 | 23.3 | 10.00 | 23.3 |
| 400 Wollastocoat 10222 | 5.00 | 11.6 | 5.00 | 11.6 | 5.00 | 11.6 | 5.00 | 11.6 | 5.00 | 11.6 |
| Halar 500LC | | | 25.00 | 58.2 | | | | | | |
| Kynar Flex 2500-20 | | | | | 25.00 | 58.2 | | | 12.50 | 29.1 |
| Dyneon THV 815X | | | | | | | 25.00 | 58.2 | | |
| PFA | | | | | | | | | 12.50 | 29.1 |

| | Example 7a | | Example 7b | | Example 7c | | Example 7d | | Example 7e | |
|---|---|---|---|---|---|---|---|---|---|---|
| Ingredient | pphr | g | pphr | g | pphr | g | pphr | g | Pphr | g |
| Dyneon FE5840 | 70.0 | 158.2 | 70.0 | 158.2 | 70.0 | 158.2 | 70.0 | 158.2 | 70.0 | 158.2 |
| Dyneon BRE 7231X | 30.0 | 67.8 | 30.0 | 67.8 | 30.0 | 67.8 | 30.0 | 67.8 | 30.0 | 67.8 |
| Hylar MP-10 | 25.0 | 56.5 | | | | | | | | |
| Renofit CF | 6.0 | 13.6 | 6.0 | 13.6 | 6.0 | 13.6 | 6.0 | 13.6 | 6.0 | 13.6 |
| Elastomag 170 | 3.0 | 6.8 | 3.0 | 6.8 | 3.0 | 6.8 | 3.0 | 6.8 | 3.0 | 6.8 |
| Struktol WS-280 | 1.0 | 2.3 | 1.0 | 2.3 | 1.0 | 2.3 | 1.0 | 2.3 | 1.0 | 2.3 |
| Austin Black | 10.00 | 22.6 | 10.00 | 22.6 | 10.00 | 22.6 | 10.00 | 22.6 | 10.00 | 22.6 |
| Tecnoflon FPA-1 | 1.00 | 2.3 | 1.00 | 2.3 | 1.00 | 2.3 | 1.00 | 2.3 | 1.00 | 2.3 |
| Graphite 4467 | 5.00 | 11.3 | 5.00 | 11.3 | 5.00 | 11.3 | 5.00 | 11.3 | 5.00 | 11.3 |
| Nyad 400 | 10.00 | 22.6 | 10.00 | 22.6 | 10.00 | 22.6 | 10.00 | 22.6 | 10.00 | 22.6 |
| 400 Wollastocoat 10222 | 5.00 | 11.3 | 5.00 | 11.3 | 5.00 | 11.3 | 5.00 | 11.3 | 5.00 | 11.3 |
| Halar 500LC | | | 25.00 | 56.5 | | | | | | |
| Kynar Flex 2500-20 | | | | | 25.00 | 56.5 | | | 12.50 | 28.3 |
| Dyneon THV 815X | | | | | | | 25.00 | 56.5 | | |

-continued

|  | | | | | | | | | 12.50 | 28.3 |
|---|---|---|---|---|---|---|---|---|---|---|
| PFA | | | | | | | | | 12.50 | 28.3 |
| PTFE (F-5) Powder | 5.00 | 11.3 | 5.00 | 11.3 | 5.00 | 11.3 | 5.00 | 11.3 | 5.00 | 11.3 |

| | Example 8a | | Example 8b | | Example 8c | | Example 8d | | Example 8e | |
|---|---|---|---|---|---|---|---|---|---|---|
| Ingredient | pphr | g | pphr | g | pphr | g | pphr | g | pphr | g |
| Tecnoflon FOR 50 HS | 100.0 | 226.0 | 100.0 | 226.0 | 100.0 | 226.0 | 100.0 | 226.0 | 100.0 | 226.0 |
| Hylar MP-10 | 25.0 | 56.5 | | | | | | | | |
| Rhenofit CF | 6.0 | 13.6 | 6.0 | 13.6 | 6.0 | 13.6 | 6.0 | 13.6 | 6.0 | 13.6 |
| Elastomag 170 | 3.0 | 6.8 | 3.0 | 6.8 | 3.0 | 6.8 | 3.0 | 6.8 | 3.0 | 6.8 |
| Struktol WS-280 | 1.0 | 2.3 | 1.0 | 2.3 | 1.0 | 2.3 | 1.0 | 2.3 | 1.0 | 2.3 |
| Austin Black | 10.00 | 22.6 | 10.00 | 22.6 | 10.00 | 22.6 | 10.00 | 22.6 | 10.00 | 22.6 |
| Tecnoflon FPA-1 | 1.00 | 2.3 | 1.00 | 2.3 | 1.00 | 2.3 | 1.00 | 2.3 | 1.00 | 2.3 |
| Graphite 4467 | 5.00 | 11.3 | 5.00 | 11.3 | 5.00 | 11.3 | 5.00 | 11.3 | 5.00 | 11.3 |
| Nyad 400 | 10.00 | 22.6 | 10.00 | 22.6 | 10.00 | 22.6 | 10.00 | 22.6 | 10.00 | 22.6 |
| 400 Wollastocoat 10222 | 5.00 | 11.3 | 5.00 | 11.3 | 5.00 | 11.3 | 5.00 | 11.3 | 5.00 | 11.3 |
| Halar 500LC | | | 25.00 | 56.5 | | | | | | |
| Kynar Flex 2500-20 | | | | | 25.00 | 56.5 | | | 12.50 | 28.3 |
| Dyneon THV 815X | | | | | | | 25.00 | 56.5 | | |
| PFA | | | | | | | | | 12.50 | 28.3 |
| PTFE (F-5) Powder | 5.00 | 11.3 | 5.00 | 11.3 | 5.00 | 11.3 | 5.00 | 11.3 | 5.00 | 11.3 |

| | Example 9a | | Example 9b | | Example 9c | | Example 9d | | Example 9e | |
|---|---|---|---|---|---|---|---|---|---|---|
| Ingredient | pphr | g | pphr | g | pphr | g | pphr | g | pphr | g |
| Tecnoflon FOR 80 HS | 100.0 | 226.0 | 100.0 | 226.0 | 100.0 | 226.0 | 100.0 | 226.0 | 100.0 | 226.0 |
| Hylar MP-10 | 25.0 | 56.5 | | | | | | | | |
| Rhenofit CF | 6.0 | 13.6 | 6.0 | 13.6 | 6.0 | 13.6 | 6.0 | 13.6 | 6.0 | 13.6 |
| Elastomag 170 | 3.0 | 6.8 | 3.0 | 6.8 | 3.0 | 6.8 | 3.0 | 6.8 | 3.0 | 6.8 |
| Struktol WS-280 | 1.0 | 2.3 | 1.0 | 2.3 | 1.0 | 2.3 | 1.0 | 2.3 | 1.0 | 2.3 |
| Austin Black | 10.00 | 22.6 | 10.00 | 22.6 | 10.00 | 22.6 | 10.00 | 22.6 | 10.00 | 22.6 |
| Tecnoflon FPA-1 | 1.00 | 2.3 | 1.00 | 2.3 | 1.00 | 2.3 | 1.00 | 2.3 | 1.00 | 2.3 |
| Graphite 4467 | 5.00 | 11.3 | 5.00 | 11.3 | 5.00 | 11.3 | 5.00 | 11.3 | 5.00 | 11.3 |
| Nyad 400 | 10.00 | 22.6 | 10.00 | 22.6 | 10.00 | 22.6 | 10.00 | 22.6 | 10.00 | 22.6 |
| 400 Wollastocoat 10222 | 5.00 | 11.3 | 5.00 | 11.3 | 5.00 | 11.3 | 5.00 | 11.3 | 5.00 | 11.3 |
| Halar 500LC | | | 25.00 | 56.5 | | | | | | |
| Kynar Flex 2500-20 | | | | | 25.00 | 56.5 | | | 12.50 | 28.3 |
| Dyneon THV 815X | | | | | | | 25.00 | 56.5 | | |
| PFA | | | | | | | | | 12.50 | 28.3 |
| PTFE (F-5) Powder | 5.00 | 11.3 | 5.00 | 11.3 | 5.00 | 11.3 | 5.00 | 11.3 | 5.00 | 11.3 |

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A processable rubber composition comprising a cured fluorocarbon elastomer mixture dispersed in a matrix comprising a thermoplastic material mixture, the thermoplastic material matrix comprising a non-fluorine containing polymeric material,
   wherein the cured fluorocarbon elastomer mixture comprises a first wear package and the thermoplastic material mixture comprises a second wear package; and
   wherein the composition is dynamically vulcanized to form a thermoplastic elastomer dynamic vulcanizate comprising a non-continuous, discrete phase elastomeric material dispersed in a continuous phase matrix comprising a thermoplastic material.

2. A composition according to claim 1, wherein the first wear package comprises at least one additive selected from the group consisting of: graphite, calcium meta-silicate, wollastonite, and mixtures thereof.

3. A composition according to claim 1, wherein the first wear package comprises graphite.

4. A composition according to claim 1, wherein the second wear package comprises at least one additive selected from the group consisting of: PTFE, graphite, polyimide, $MoS_2$, silicone, carbon, boron, aramid, silicone oil, uncured fluorocarbon elastomer, and mixtures thereof.

5. A composition according to claim 1, wherein the second wear package comprises an additive in fiber form.

6. A composition according to claim 5, wherein the fiber additive has an average aspect ratio of about 1.5:50.

7. A composition according to claim 1, wherein the second wear package comprises an additive in powder form.

8. A composition according to claim 7, wherein the additive comprises PTFE powder.

9. A composition according to claim 7, wherein the powder has a particle size from about 0.01 to about 1,000 μm.

10. A composition according to claim 1, wherein the second wear package comprises a chemically modified additive.

11. A composition according to claim 1, wherein the second wear package comprises a physically modified additive.

12. A composition according to claim 11, wherein the additive is plasma treated.

13. A composition according to claim 1, wherein the fluorocarbon elastomer is present at a level of greater than or equal to 35% by weight based on the total weight of the composition.

14. A composition according to claim 1, wherein the first wear package is present at a level of between about 1% to about 15% by weight based on the total weight of the cured fluorocarbon elastomer and first wear package combined.

15. A composition according to claim 1, wherein the second wear package is present at a level of between about 1% to about 10% by weight based on the total weight of the thermoplastic material and second wear package combined.

16. A composition according to claim 1, wherein the first wear package comprises at least one additive also present in the second wear package.

17. A composition according to claim 1, wherein the first and the second wear packages comprise different additives.

18. A composition according to claim 1, wherein the fluorocarbon elastomer is partially cured.

19. A composition according to claim 1, wherein the thermoplastic material mixture comprises a fully fluorinated melt-processable thermoplastic polymer.

* * * * *